United States Patent
Yoshii et al.

(10) Patent No.: US 8,085,866 B2
(45) Date of Patent: Dec. 27, 2011

(54) RADIO TRANSMISSION APPARATUS, RADIO RECEPTION APPARATUS, MODULATION METHOD, AND DEMODULATION METHOD

(75) Inventors: Isamu Yoshii, Kanagawa (JP); Alexander Edler Von Elbwart Golitschek, Darmstadt (DE)

(73) Assignee: Panasonic Corporation, Osaka (JP)

( * ) Notice: Subject to any disclaimer, the term of this patent is extended or adjusted under 35 U.S.C. 154(b) by 766 days.

(21) Appl. No.: 11/719,905

(22) PCT Filed: Nov. 22, 2005

(86) PCT No.: PCT/JP2005/021429
§ 371 (c)(1),
(2), (4) Date: Nov. 28, 2007

(87) PCT Pub. No.: WO2006/057238
PCT Pub. Date: Jun. 1, 2006

(65) Prior Publication Data
US 2009/0225894 A1 Sep. 10, 2009

(30) Foreign Application Priority Data
Nov. 24, 2004 (JP) .................................. 2004-339500

(51) Int. Cl.
H04L 27/00 (2006.01)
(52) U.S. Cl. .......................... 375/295; 375/316; 375/260
(58) Field of Classification Search .................. 375/295, 375/316
See application file for complete search history.

(56) References Cited

U.S. PATENT DOCUMENTS

| 6,580,762 | B1 | 6/2003 | Tsumura | |
|---|---|---|---|---|
| 2003/0171121 | A1* | 9/2003 | Kim et al. | 455/451 |
| 2004/0181618 | A1 | 9/2004 | Dottling | |
| 2005/0094615 | A1* | 5/2005 | Kim et al. | 370/349 |

FOREIGN PATENT DOCUMENTS

| JP | 7-273740 | 10/1995 |
|---|---|---|
| JP | 2000-201084 | 7/2000 |
| JP | 2003-319007 | 11/2003 |
| JP | 2004-266739 | 9/2004 |
| JP | 2004-297118 | 10/2004 |
| JP | 2004-531166 | 10/2004 |

OTHER PUBLICATIONS

PCT International Search Report dated Feb. 7, 2006.

* cited by examiner

*Primary Examiner* — Shuwang Liu
*Assistant Examiner* — Michael Neff
(74) *Attorney, Agent, or Firm* — Dickinson Wright PLLC

(57) ABSTRACT

A rate matching apparatus is capable of improving the bit error rate characteristic at a data receiving end. A rate matching part (106), which serves as a rate matching apparatus, generates, from a first encoded block corresponding to N symbols (where N is an integer equal to or greater than one), a second encoded block corresponding to N+K symbols (where K is an integer equal to or greater than one). In the rate matching part (106), a to-be-divided bit-group extracting part (122) extracts, from the first encoded block, a first bit group corresponding to any of the N symbols. A dividing part (124) divides the extracted first bit group into L divided bit groups corresponding to L symbols (where L is an integer equal to or greater than two but equal to or smaller than K+1), thereby providing the second encoded block.

15 Claims, 15 Drawing Sheets

| S1 | S2 | S3 | S4 | S5 | S6 | S7 | S8 | S9 | S10 | S11 | S12 |
|----|----|----|----|----|----|----|----|----|-----|-----|-----|
| 2  | 2  | 2  | 2  | 2  | 2  | 4  | 4  | 4  | 4   | 4   | 4   |

FIG.3

| MODULATION SCHEME | BIT STREAM | BIT 1 | BIT 2 | BIT 3 | BIT 4 |
|---|---|---|---|---|---|
| 16QAM | 1011 | 2.529822 | 2.529822 | 1.264911 | 1.264911 |
| 16QAM | 1001 | 1.264911 | 2.529822 | 1.264911 | 1.264911 |
| 16QAM | 0001 | 1.264911 | 2.529822 | 1.264911 | 1.264911 |
| 16QAM | 0011 | 2.529822 | 2.529822 | 1.264911 | 1.264911 |
| 16QAM | 1010 | 2.529822 | 1.264911 | 1.264911 | 1.264911 |
| 16QAM | 1000 | 1.264911 | 1.264911 | 1.264911 | 1.264911 |
| 16QAM | 0000 | 1.264911 | 1.264911 | 1.264911 | 1.264911 |
| 16QAM | 0010 | 2.529822 | 1.264911 | 1.264911 | 1.264911 |
| 16QAM | 1110 | 2.529822 | 1.264911 | 1.264911 | 1.264911 |
| 16QAM | 1100 | 1.264911 | 1.264911 | 1.264911 | 1.264911 |
| 16QAM | 0100 | 1.264911 | 1.264911 | 1.264911 | 1.264911 |
| 16QAM | 0110 | 2.529822 | 1.264911 | 1.264911 | 1.264911 |
| 16QAM | 1111 | 2.529822 | 2.529822 | 1.264911 | 1.264911 |
| 16QAM | 1101 | 1.264911 | 2.529822 | 1.264911 | 1.264911 |
| 16QAM | 0101 | 1.264911 | 2.529822 | 1.264911 | 1.264911 |
| 16QAM | 0111 | 2.529822 | 2.529822 | 1.264911 | 1.264911 |

FIG.6

| MODULATION SCHEME | BIT STREAM | BIT 1 | BIT 2 |
|---|---|---|---|
| QPSK | 10 | 2.00 | 2.00 |
| QPSK | 00 | 2.00 | 2.00 |
| QPSK | 11 | 2.00 | 2.00 |
| QPSK | 01 | 2.00 | 2.00 |

RADIO TRANSMISSION APPARATUS, RADIO RECEPTION APPARATUS, MODULATION METHOD, AND DEMODULATION METHOD

TECHNICAL FIELD

The present invention relates to a rate matching apparatus, radio transmitting apparatus, radio receiving apparatus, and rate matching method used in a radio communication system that performs rate matching in units of symbols.

BACKGROUND ART

When data is transmitted through a radio communication system, the transmission rate is adjusted on the data transmitting side. That is, rate matching is performed on the data transmitting side. For example, in the rate matching method disclosed in Patent Document 1, rate matching is performed in units of symbols. For example, when output of M symbols (where M is an integer greater than N) is to be obtained in response to input of N symbols (where N is an integer greater than or equal to 1), one of the N input symbols is repeatedly outputted (copied) as it is and the number of output symbols increases.

Patent Document 1: Japanese Patent Application Laid-Open No. 2000-201084

DISCLOSURE OF THE INVENTION

Problems to be Solved by the Invention

However, in the above conventional rate matching method, as the symbols modulated using a certain modulation scheme are copied as they are and the number of output symbols is increased, if the M-ary number of the modulation scheme increases, the variation of bit likelihood expands. As a result, there is a problem that the bit error rate characteristics deteriorate on the data receiving side.

It is therefore an object of the present invention, in view of the problems described above, to provide a rate matching apparatus, radio transmitting apparatus, radio receiving apparatus, and rate matching method capable of improving the bit error rate characteristics on the data receiving side.

Means for Solving the Problem

The rate matching apparatus of the present invention generates a second coded block corresponding to N+K symbols (where N is an integer greater than or equal to 1, K is an integer greater than or equal to 1) from a first coded block corresponding to N symbols and employs a configuration having an extraction section that extracts a first bit group corresponding to one of the N symbols from the first coded block and a division section that divides the first bit group into L divided bit groups corresponding to L symbols (where L is an integer greater than or equal to 2 and less than or equal to K+1) to obtain the second coded block.

The radio transmitting apparatus of the present invention employs a configuration having the above rate matching apparatus and a setting section that sets a modulation scheme used in modulation of one of the L divided bit groups to a second modulation scheme having a lower M-ary number than a M-ary number of a first modulation scheme, wherein each one of the N symbols is a symbol of the first modulation scheme selected in advance from a plurality of modulation schemes.

The radio receiving apparatus of the present invention employs a configuration having a reception section that receives N+K symbols generated from a second coded block obtained by dividing a bit group corresponding to one of N symbols of a first coded block into L divided bit groups corresponding to L symbols, a setting section that sets a modulation scheme used in demodulation of one of the L symbols out of the N+K symbols to a second modulation scheme having a lower M-ary number than a M-ary number of a first modulation scheme used in demodulation of a symbol other than the L symbols out of the N+K symbols; and a demodulation section that demodulates the symbol other than the L symbols out of the N+K symbols using the first modulation scheme and demodulates the one of the L symbols using the second modulation scheme.

The rate matching method of the present invention generates a second coded block corresponding to N+K symbols (where N is an integer greater than or equal to 1, K is an integer greater than or equal to 1) from a first coded block corresponding to an N symbol and includes the steps of an extraction step of extracting a first bit group corresponding to one of the N symbols from the first coded block and a division step of dividing the first bit group into L divided bit groups corresponding to L symbols (where L is an integer greater than or equal to 2 and less than or equal to K+1) to obtain the second coded block.

Advantageous Effect of the Invention

The present invention improves bit error rate characteristics on the data receiving side.

BRIEF DESCRIPTION OF DRAWINGS

FIG. 3 is a diagram showing a modulation scheme designating signal according to Embodiment 1 of the present invention;

FIG. 6 is a diagram showing the distribution of the minimum Euclidean distance per 16 QAM symbol bit;

BEST MODE FOR CARRYING OUT THE INVENTION

Embodiments of the present invention will be described in detail with reference to the accompanying drawings.

Embodiment 1

Figure 1:
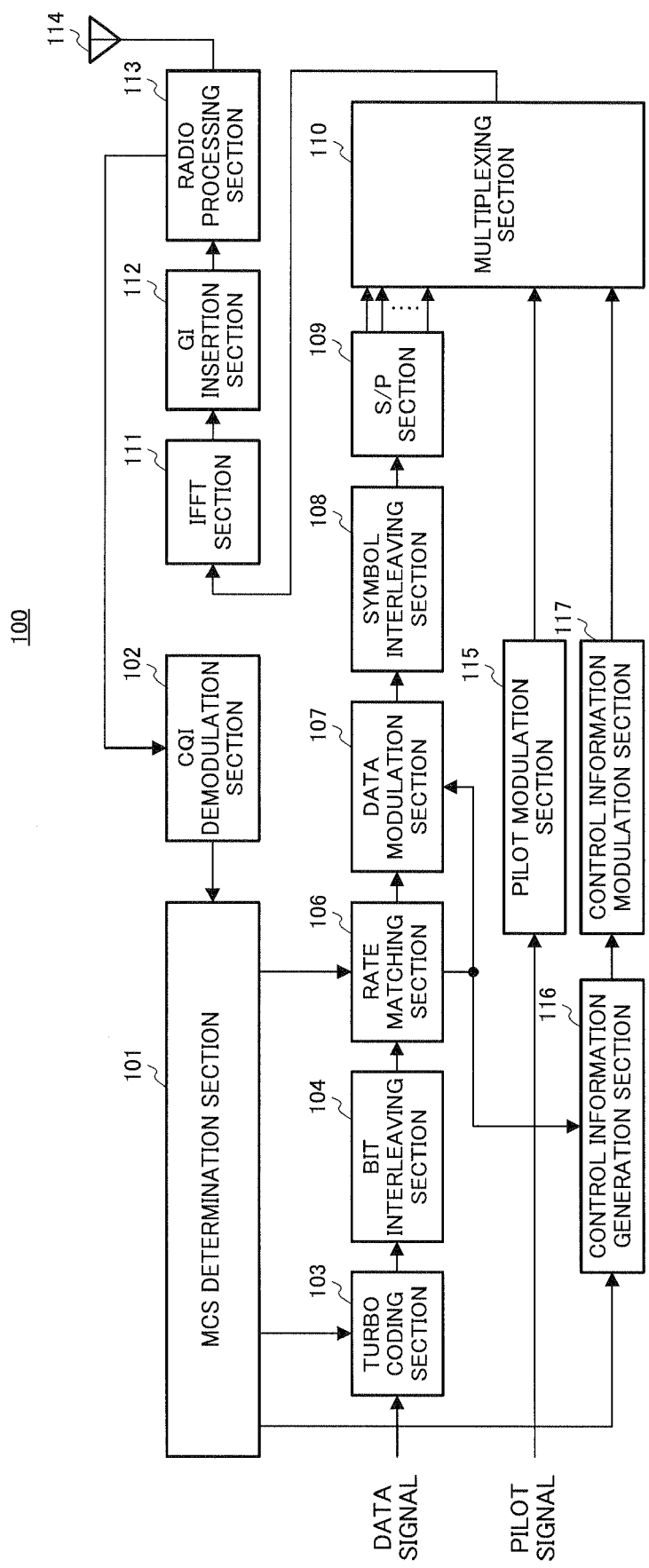
FIG. 1 is a block diagram showing the configuration of a base station apparatus according to Embodiment 1 of the present invention.

FIG. 1 is a block diagram showing the configuration of a base station apparatus according to Embodiment 1 of the present invention.

A case will be described with this embodiment where base station apparatus 100 (or "Node B") is used as a radio transmitting apparatus that transmits data signals to mobile station apparatus 150 (or "UE") described later, and where mobile station apparatus 150 is used as a radio receiving apparatus that receives the data signals transmitted from base station apparatus 100 is described. Further, a case will be described with this embodiment where rate matching is performed to increase the number of symbols included in a coded block from N to M. The value of M−N, i.e., the increment of the number of symbols, is defined as K (where K is an integer greater than or equal to 1).

Base station apparatus 100 includes MCS (Modulation and Coding Scheme) determination section 101, CQI (Channel Quality Indicator) demodulation section 102, turbo coding section 103, bit interleaving section 104, rate matching section 106, data modulation section 107, symbol interleaving section 108, S/P conversion (Serial-to-Parallel) section 109, multiplexing section 110, IFFT (Inverse Fast Fourier Transform) section 111, GI (Guard Interval) insertion section 112, radio processing section 113, antenna 114, pilot modulation section 115, control information generation section 116, and control information modulation section 117.

Radio processing section 113 receives channel quality information (CQI) fed back from mobile station apparatus 150 through antenna 114. Radio processing section 113 performs predetermined radio receiving processing (for example, down-conversion and A/D conversion) on the received CQI, and outputs the CQI after radio receiving processing to CQI demodulation section 102.

Further, radio processing section 113 performs predetermined radio transmitting processing (for example, D/A conversion and up-conversion) on the OFDM signal with GI inserted by GI insertion section 112, and transmits the OFDM signal after radio transmitting processing to mobile station apparatus 150 through antenna 114.

CQI demodulation section 102 demodulates the CQI inputted from radio processing section 113. Furthermore, CQI may be referred to as "CSI" (Channel State Information), etc.

MCS determination section 101 determines the MCS, i.e. the coding rate and modulation scheme, of data signals which are transmitted to mobile station apparatus 150. The MCS is determined based on the CQI demodulated by CQI demodulation section 102. To be more specific, the MCS is determined by selecting, from a plurality of coding rate and modulation scheme candidates, the coding rate and modulation scheme that correspond to the CQI. As for the modulation scheme, for example, either QPSK (Quadrature Phase Shift Keying) or 16 QAM (Quadrature Amplitude Modulation) is selected. The determined coding rate is specified to turbo coding section 103 and control information generation section 116, and the determined modulation scheme is specified to rate matching section 106.

Turbo coding section 103 performs turbo coding for the data signals in accordance with the specified coding rate. As a result, a coded block corresponding to N symbols is obtained.

Bit interleaving section 104 performs bit interleaving on the coded block obtained from turbo coding section 103.

Figure 2:
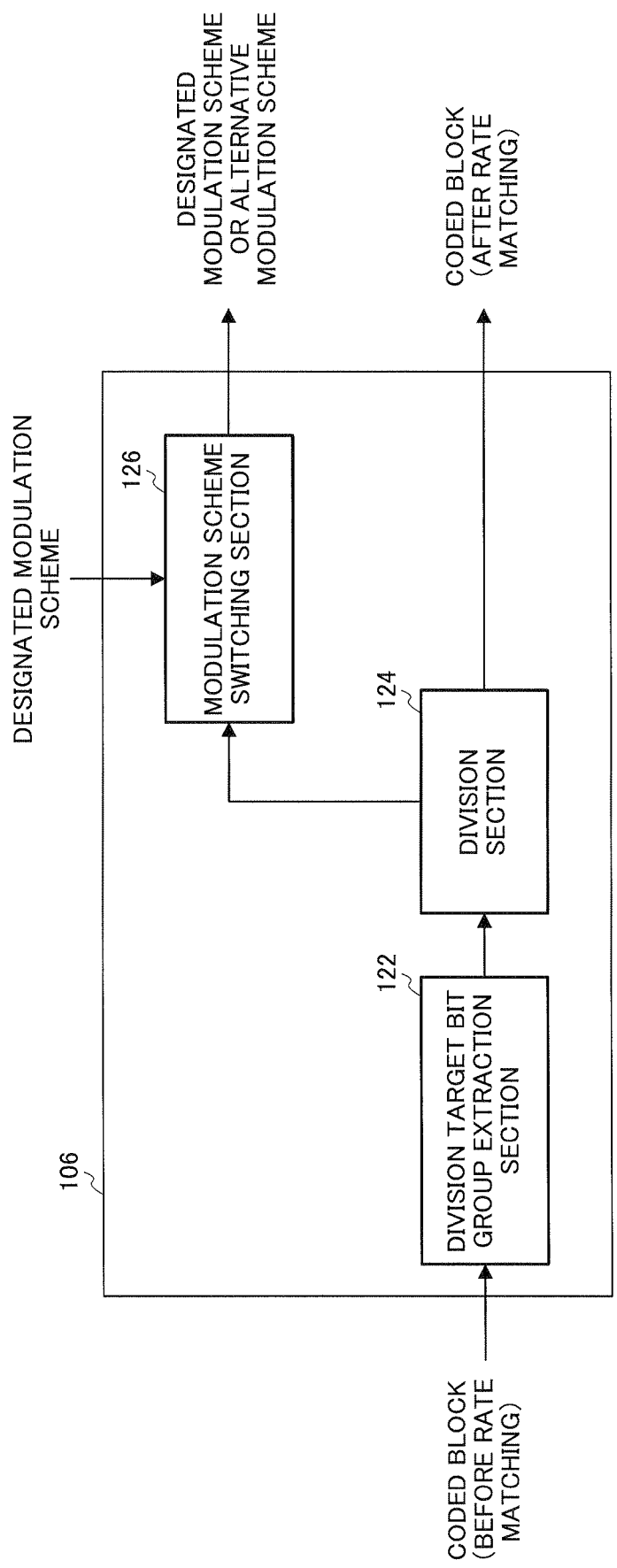
FIG. 2 is a block diagram showing the configuration of a rate matching section according to Embodiment 1 of the present invention.

Rate matching section 106 used as a rate matching apparatus, as shown in FIG. 2, includes division target bit group extraction section 122, division section 124, and modulation scheme switching section 126.

Division target bit group extraction section 122 extracts, from the coded block (input coded block) subjected to bit interleaving by bit interleaving section 104, K bit groups (specifically, K groups each constituted of bit stream of 2 bits or more) corresponding to K symbols out of the N symbols as division target bit groups ("target bit groups"), and outputs the result to division section 124. In the present embodiment, K bit groups corresponding to the initial symbol to the Kth symbol are extracted as target bit groups. N−K bit groups that are not extracted are outputted to division section 124 as non-target bit groups.

Division section 124 divides each one of K target bit groups by L (where L is an integer greater than or equal to 2). In the present embodiment, division section 124 divides each one of K target bit groups by two and obtains 2K divided bit groups. For example, when a target bit group is formed with 4 bits, two divided bit groups formed with two bits are generated from one target bit group. Then, in the coded block, original K target bit groups are replaced with 2K divided bit groups. Further, non-target bit groups are left as non-divided bit groups. In this manner, a coded block (output coded block) after rate matching is obtained. The output coded block is outputted to data modulation section 107.

The output coded block is constituted of N−K non-divided bit groups and 2K divided bit groups. Accordingly, the output coded block corresponds to M symbols (M=N−K+2K). Further, in the case of the present embodiment, the number of bits forming the output coded block has the same number of bits as the input coded block.

Division section 124 reports information related to divided bit groups to modulation scheme switching section 126.

Modulation scheme switching section 126 used as a setting means sets the modulation scheme used for the modulation of divided bit groups based on information reported from division section 124. To be more specific, modulation scheme switching section 126 switches and sets the modulation scheme of divided bit groups to a modulation scheme (alternative modulation scheme) having a lower M-ary number than a M-ary number of the modulation scheme (designated modulation scheme) selected in advance by MCS determination section 101. For example, when the designated modulation scheme is 16 QAM, QPSK is set as the alternative modulation scheme. Further, for non-divided bit groups, the designated modulation scheme is set as it is. The set designated modulation scheme or alternative modulation scheme is reported to data modulation section 107 and control information generation section 116.

A modulation scheme designating signal, such as that shown in FIG. 3, is used to report the set modulation scheme. The modulation scheme designating signal indicates the number of bits of symbols S1 to S6 as "2" (that is, the modulation scheme is set to QPSK), and the number of bits of symbols S7 to S12 as "4" (that is, the modulation scheme is set to 16 QAM).

Furthermore, although a case has been described with this embodiment as an example where base station apparatus 100 has a configuration that provides modulation scheme switching section 126 provided rate matching section 106, the configuration of base station apparatus 100 is not limited only to the case described above.

Data modulation section 107 modulates non-divided bit groups in the output coded block using the designated modulation scheme reported from modulation scheme switching section 126. Further, data modulation section 107 modulates divided bit groups in the output coded block using the alternative modulation scheme reported from modulation scheme switching section 126. The modulated signal generated in this manner is constituted of M symbols. The modulated signal is outputted to symbol interleaving section 108.

Although the case has been described with the present embodiment as an example where base station apparatus 100 has a configuration of data modulation section 107 at a subsequent stage to rate matching section 106, the configuration of base station apparatus 100 is not limited only to the case as described above. That is, data modulation section 107 may be provided inside rate matching section 106.

Symbol interleaving section 108 performs symbol interleaving on the modulated signal inputted from data modulation section 107. S/P section 109 performs serial-to-parallel conversion on the modulated signal subjected to symbol interleaving and outputs the result to multiplexing section 110.

Pilot modulation section 115 modulates the pilot signal having a known signal sequence and obtains the pilot symbol. The obtained pilot symbol is outputted to multiplexing section 110.

Control information generation section 116 generates control information for reporting the coding rate of the coded block and the modulation scheme of symbols to mobile station apparatus 150. For reporting the modulation scheme of symbols (bit groups), the above modulation scheme specifying signal is used. When mobile station apparatus 150 knows (a) the modulation scheme of non-divided bit groups, (b) the modulation scheme of divided bit groups, and (c) the positions of divided bit groups determined in accordance with the increment of the number of symbols K, control information generation section 116 may generate control information for reporting only the number of symbols N and the number of symbols M in addition to the coding rate. In this case, the amount of signaling can be reduced.

Control information modulation section 117 modulates the generated control information. The modulated control information is outputted to multiplexing section 110.

Multiplexing section 110 multiplexes the modulated signal inputted from S/P section 109, the pilot symbol inputted from pilot modulation section 115, and the control information inputted from control information modulation section 117 in accordance with a predetermined scheme. The signal obtained by multiplexing is outputted to IFFT section 111.

IFFT section 111 performs IFFT processing on the signal inputted from multiplexing section 110 and obtains an OFDM signal. The obtained OFDM signal is outputted to GI insertion section 112. GI insertion section 112 inserts GI into a predetermined position of the OFDM signal inputted from IFFT section 111.

Figure 4:
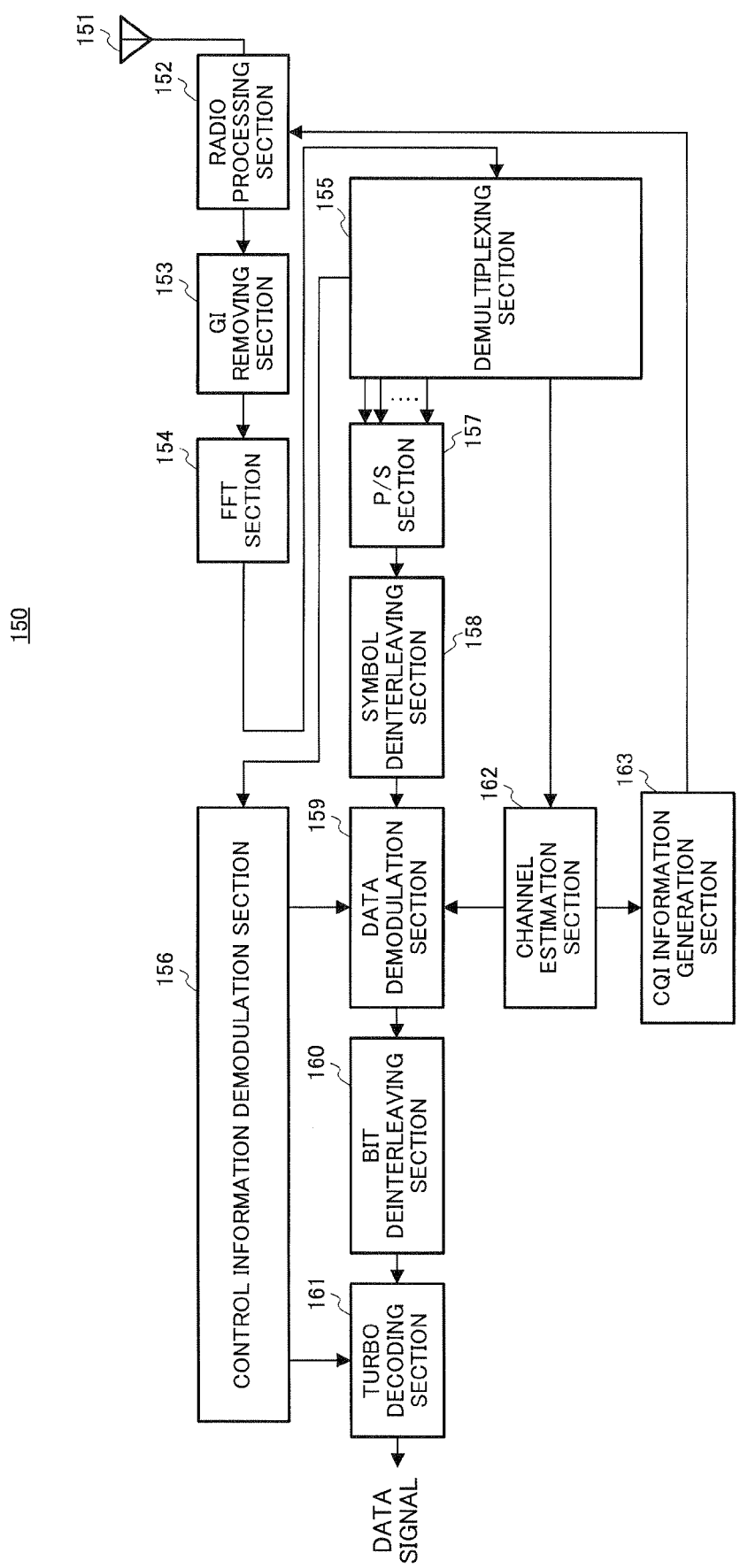
FIG. 4 is a block diagram showing the configuration of a mobile station apparatus according to Embodiment 1 of the present invention.

FIG. 4 is a block diagram showing the configuration of a mobile station apparatus that performs radio communication with base station apparatus 100. Mobile station apparatus 150 includes antenna 151, radio processing section 152, GI removing section 153, FFT section 154, demultiplexing section 155, control information demodulation section 156, P/S (parallel-to-serial) conversion section 157, symbol deinterleaving section 158, data demodulation section 159, bit deinterleaving section 160, turbo decoding section 161, channel estimation section 162, and CQI information generation section 163.

Radio processing section 152 receives the OFDM signal transmitted from base station apparatus 100 through antenna 151, performs predetermined radio receiving processing (for example, down-conversion or A/D conversion) on the received OFDM signal, and outputs the OFDM signal after radio receiving processing to GI removing section 153. Further, radio processing section 152 performs predetermined transmission radio processing (for example, D/A conversion and up-conversion) on the CQI generated by CQI information generation section 163, and transmits the CQI after transmission radio processing to base station apparatus through antenna 151.

GI removing section 153 removes the GI that is inserted in a predetermined position of the OFDM signal inputted from radio processing section 152. FFT section 154 performs FFT processing on the OFDM signal from which the GI is removed by GI removing section 153. Demultiplexing section 155 demultiplexes the multiplexed control information, pilot symbol, and modulated signal of the data signal of the OFDM signal that has been subjected to FFT processing. The control information is outputted to control information demodulation section 156, the pilot symbol is outputted to channel estimation section 162, and the modulated signal is outputted to P/S section 157.

Channel estimation section 162 estimates the channel using the pilot symbol inputted from demultiplexing section 155. The estimation results are reported to data demodulation section 159 and CQI information generation section 163.

CQI information generation section 163 generates CQI based on the reported channel estimation results, and outputs the CQI to radio processing section 152.

Control information demodulation section 156 demodulates the control information inputted from demultiplexing section 155. As a result of this demodulation processing, the modulation schemes (the designated modulation scheme corresponding to non-divided bit groups and the alternative modulation scheme corresponding to divided bit groups) and the coding rate of bit groups forming the coded block are obtained. The coding rate is reported to turbo decoding section 161 and the modulation schemes are reported to data demodulation section 159. Thus, of the M symbols forming the modulated signal, for symbols generated by modulating non-divided bit groups, the designated modulation scheme is set as the modulation scheme to be used in demodulation. Further, of the M symbols, for symbols generated by modulating divided bit groups, the alternative modulation scheme is set as the modulation scheme to be used in demodulation.

That is, control information demodulation section 156 includes functions of a setting means.

P/S section 157 performs parallel-to-serial conversion on the modulated signal inputted from demultiplexing section 155. Symbol deinterleaving section 158 performs symbol deinterleaving on the modulated signal subjected to parallel-to-serial conversion. The modulated signal subjected to symbol deinterleaving is outputted to data demodulation section 159.

Data demodulation section 159 demodulates the modulated signal inputted from symbol deinterleaving section 158 and performs the bit likelihood calculation based on the reported channel estimation results. This demodulation processing is performed in accordance with the modulation scheme reported from control information demodulation section 156. To be more specific, of the M symbols forming the modulated signal, symbols that are generated from non-divided bit groups are demodulated using the specified modulation scheme. Further, of the M symbols, symbols that are generated from divided bit groups are demodulated using the alternative modulation scheme. As a result of this demodulation processing, a coded block is obtained.

Bit deinterleaving section 160 performs bit deinterleaving on the demodulated coded block. Turbo decoding section 161 decodes the coded block subjected to bit deinterleaving in accordance with the coding rate designated by control information demodulation section 156 and obtains the data signal.

Figure 5:
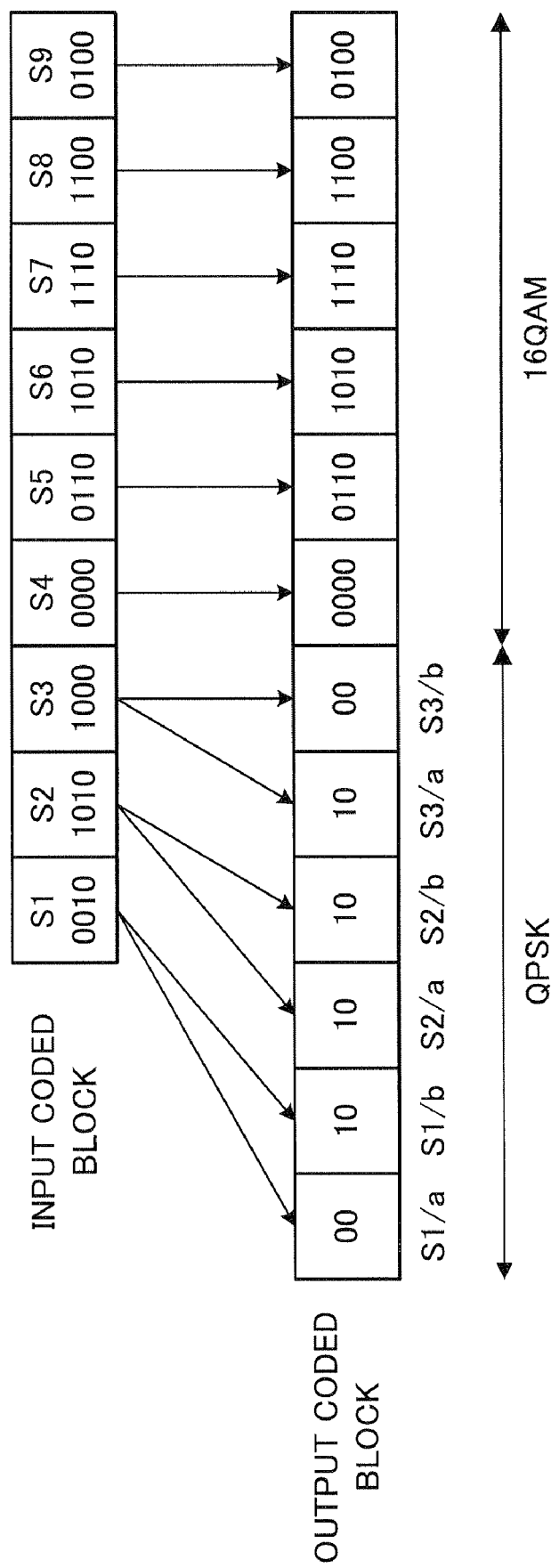
FIG. 5 is a drawing for explaining the rate matching processing and modulation processing of a base station apparatus according to Embodiment 1 of the present invention.

Next, the rate matching processing and modulation processing of base station apparatus 100 including the above configuration will be described with reference to FIG. 5. A case will be described as an example where an output coded block corresponding to 12 symbols is generated from an input coded block corresponding to 9 symbols. Further, the specified modulation scheme is set as 16 QAM and the alternative modulation scheme is set as QPSK.

First, division target bit group extraction section 122 extracts bit stream "0010" corresponding to symbol S1, bit stream "1010" corresponding to symbol S2, and bit stream "1000" corresponding to symbol S3 from the input coded block.

Then, division section 124 divides the extracted bit stream "0010" into two bit streams "00" and "10" corresponding to the two symbols S1/*a* and S1/*b*. Similarly, division section 124 divides bit stream "1010" into two bit streams "10" and "10" corresponding to the two symbols S2/*a* and S2/*b*, and divides bit stream "1000" into two bit streams "10" and "00" corresponding to the two symbols S3/*a* and S3/*b*. Bit streams corresponding to symbols S4 to S9 that are not extracted by division target bit group extraction section 122, are not divided.

Then, modulation scheme switching section 126 sets the modulation schemes for divided bit streams and non-divided bit streams. The modulation scheme for divided bit streams is set to QPSK since divided bit streams include 2 bits. The modulation scheme for non-divided bit streams is set to 16 QAM since non-divided bit streams include 4 bits.

Then, data modulation section 107 modulates the 12 separate bit streams using the respective modulation schemes. In this manner, 12 symbols including 6 QPSK symbols and 6 16 QAM symbols are generated.

Figures 7, 8:
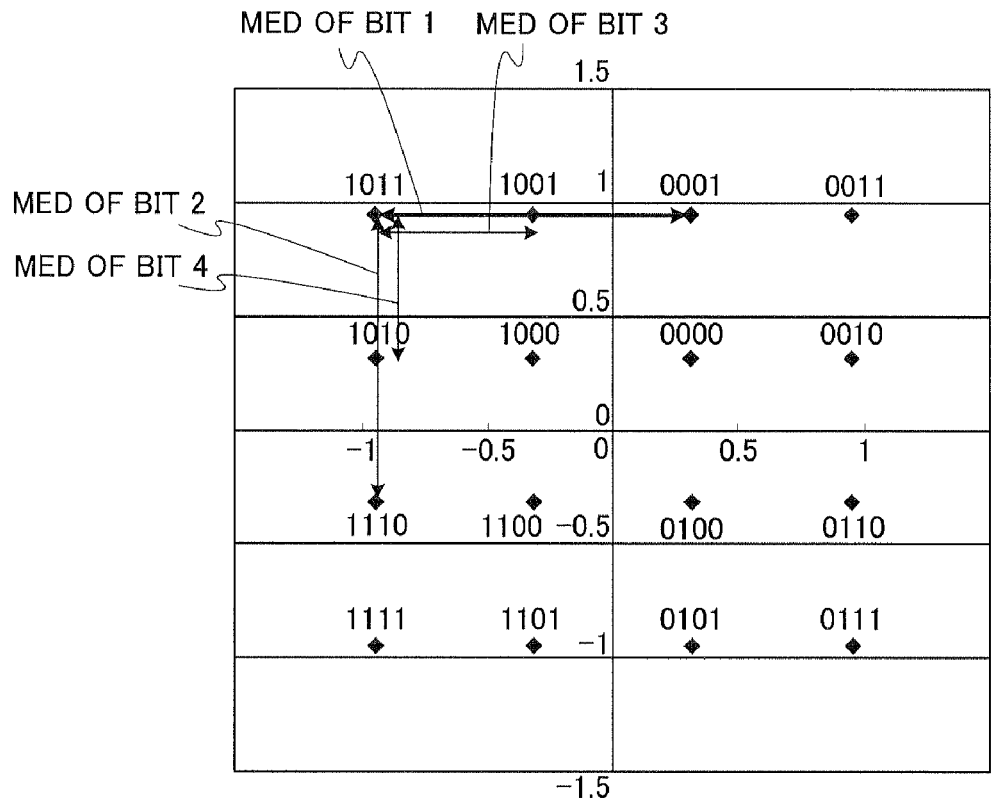
FIG. 7 is a diagram showing the minimum Euclidean distance of 16 QAM symbol bits having bit stream "1011"
FIG. 8 is a diagram showing the distribution of the minimum Euclidean distance per QPSK symbol bit.
Figure 9:
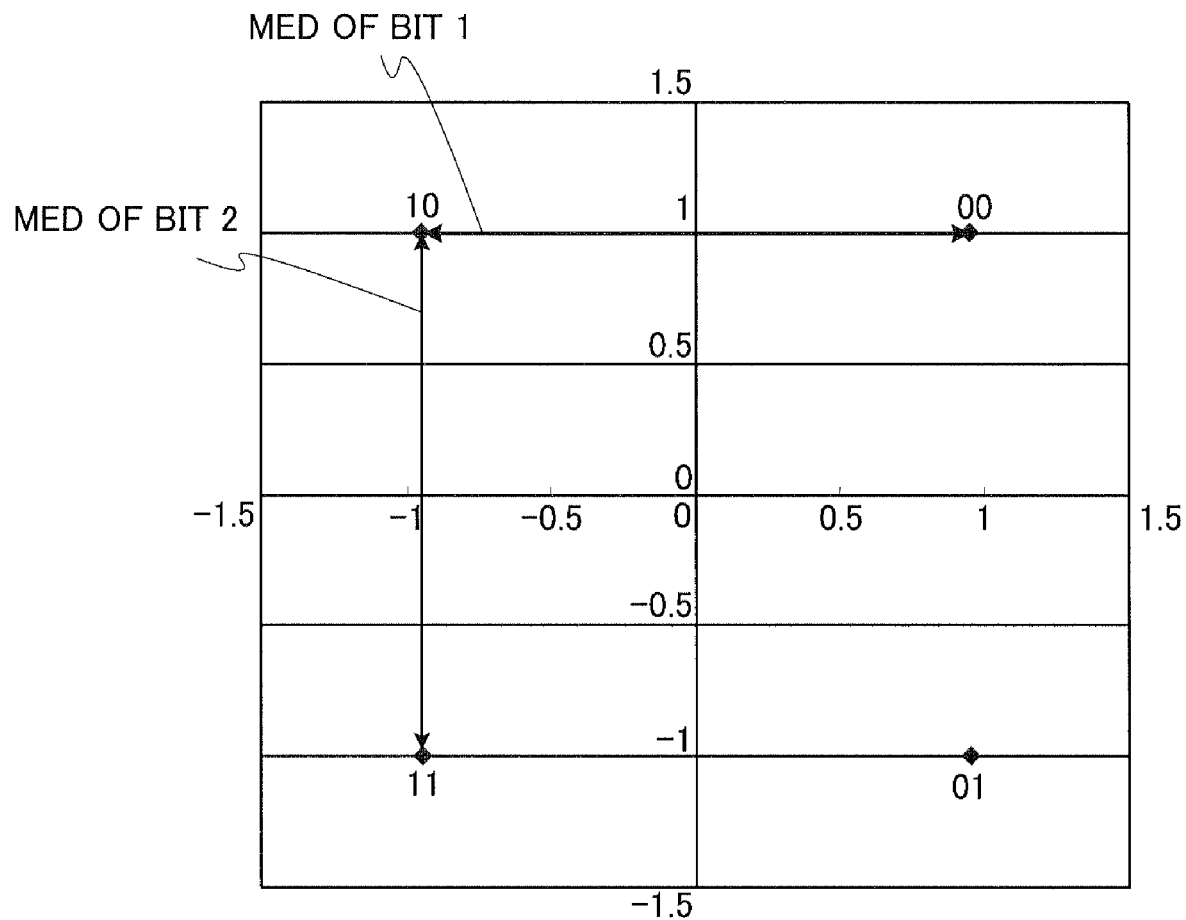
FIG. 9 is a diagram showing the minimum Euclidean distance of QPSK symbol bits having bit stream "10"

The effect of the above rate matching processing and modulation processing are described with reference to FIG. 6, FIG. 7, FIG. 8, and FIG. 9. FIG. 6 shows the distribution of the minimum Euclidean distance (MED) per bit after the synthesis of two 16 QAM symbols repeatedly transmitted under an AWGN (Additive White Gaussian Noise) environment. FIG. 7 shows as an example the MED of bits of the 16 QAM symbol whose bit stream is "1011." FIG. 8 shows the MED distribution per QPSK symbol bit. FIG. 9 shows as an example the MED of bits of the QPSK symbol whose bit stream is "10."

While MED varies between 16 QAM bits, MED does not vary between QPSK bits. Thus, as in the above rate matching processing, by dividing bit streams of 16 QAM symbols into bit streams of QPSK symbols, the MED variation per bit can be eliminated. In other words, the MED per bit can be averaged.

Further, while the MED average value is 1.58 for 16 QAM, the MED average value is 2.00 for QPSK. That is, as in the above rate matching processing, by dividing bit streams of 16 QAM symbols into bit streams of QPSK symbols, the average MED per bit can be improved.

In this manner, according to the present embodiment, in order to obtain output of M symbols in response to input of N symbols, bit groups corresponding to K symbols, i.e., M–N symbols, are divided into 2k divided bit groups modulated individually so that for 2K divided bit groups, the M-ary number of the modulation scheme can be decreased and the variation of bit likelihood can be suppressed, as a result, the bit error rate characteristics on the data receiving side can be improved.

Although, in the present embodiment, the modulation scheme used is either 16 QAM or QPSK, other modulation schemes may also be used. When other various modulation schemes are used, the division method may be variably set by diversifying the division methods of bit groups. Variable setting of the division methods is, for example, performed in accordance with the number of input symbols N and the number of output symbols M.

For example, bit groups (8 bits) corresponding to 256 QAM symbols may be divided by two into bit groups (4 bits) corresponding to 16 QAM symbols. Bit groups (6 bits) corresponding to 64 QAM symbols may be divided by three into bit groups (2 bits) corresponding to QPSK symbols. In this case, although MED varies per bit in the symbols obtained from divided bit groups, the variation can be reduced in comparison to the symbols obtained from non-divided bit groups. Further, the MED per bit can be averaged among a plurality (or all) of the symbols obtained from a plurality (or all) of divided bit groups by setting a plurality (or all) of divided bit groups to the same modulation scheme.

Furthermore, for example, bit groups (4 bits) corresponding to 16 QAM symbols may be divided by four into bit groups (1 bit) corresponding to the BPSK symbol. In this case, similar to the case where bit groups (4 bits) corresponding to 16 QAM symbols are divided by two into bit groups (2 bits) corresponding to the QPSK symbol, the MED variation per bit can be eliminated. Upon comparison of the former case with the latter case, the former provides an advantage of effectively increasing the number of symbols while the latter provides an advantage of achieving better error rate characteristics.

Furthermore, for example, bit groups (3 bits) corresponding to the 8 PSK symbol may be divided into bit groups (2 bits) corresponding to the QPSK symbol and bit groups (1 bit) corresponding to the BPSK symbol. That is, by dividing bit groups when a modulation scheme of M-ary number of 8 or more is selected in advance, an effect of MED reduction per bit can be obtained.

Further, although a case has been described with this embodiment as an example where the number of symbols is increased by three by dividing three bit groups by two, the method of increasing the number of symbols is not limited only to the case described above. For example, one bit group may be divided by four. Or, one bit group may be divided by three and one of three divided bit groups may be divided by two (or copied). Or, other appropriate methods may be employed.

Embodiment 2

Figure 10:
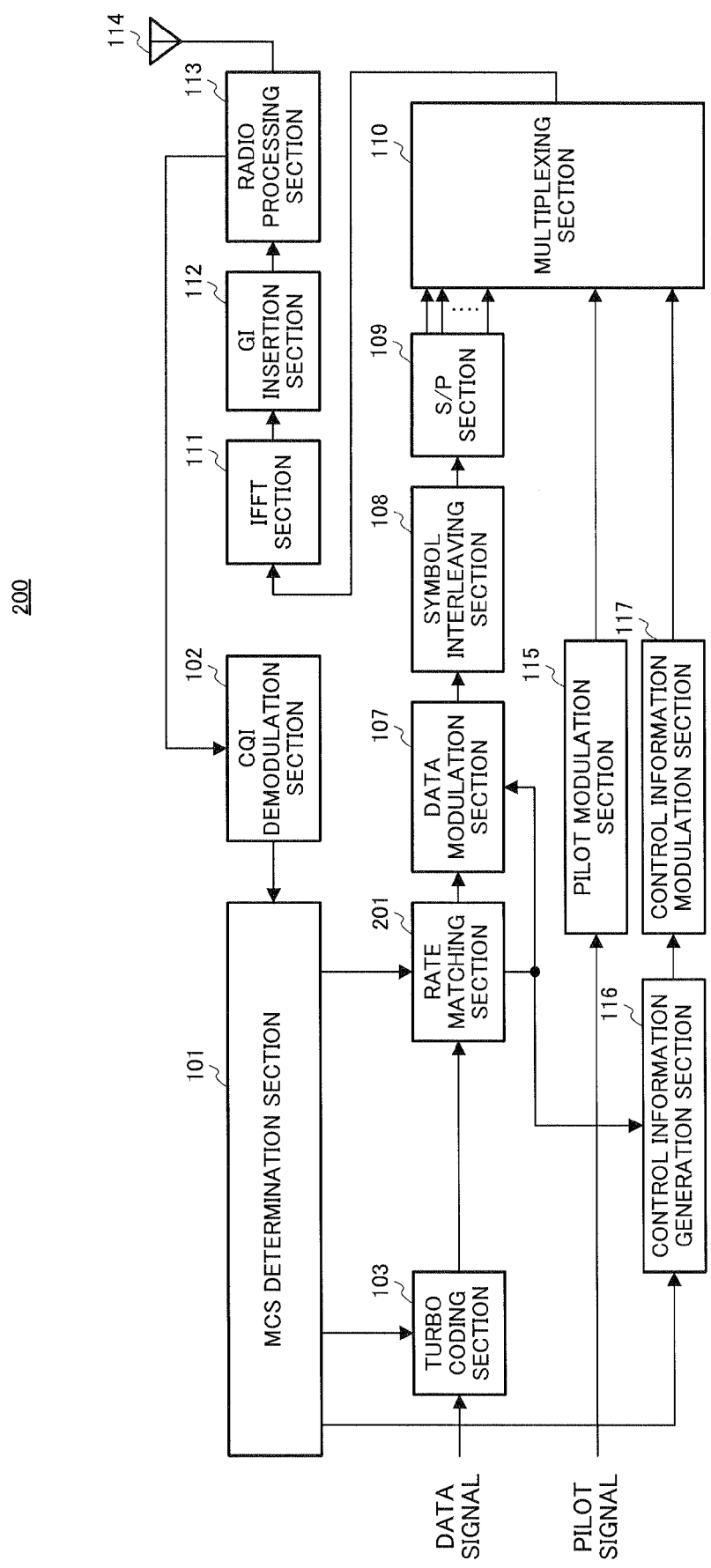
FIG. 10 is a block diagram showing the configuration of a base station apparatus according to Embodiment 2 of the present invention.
Figure 11:
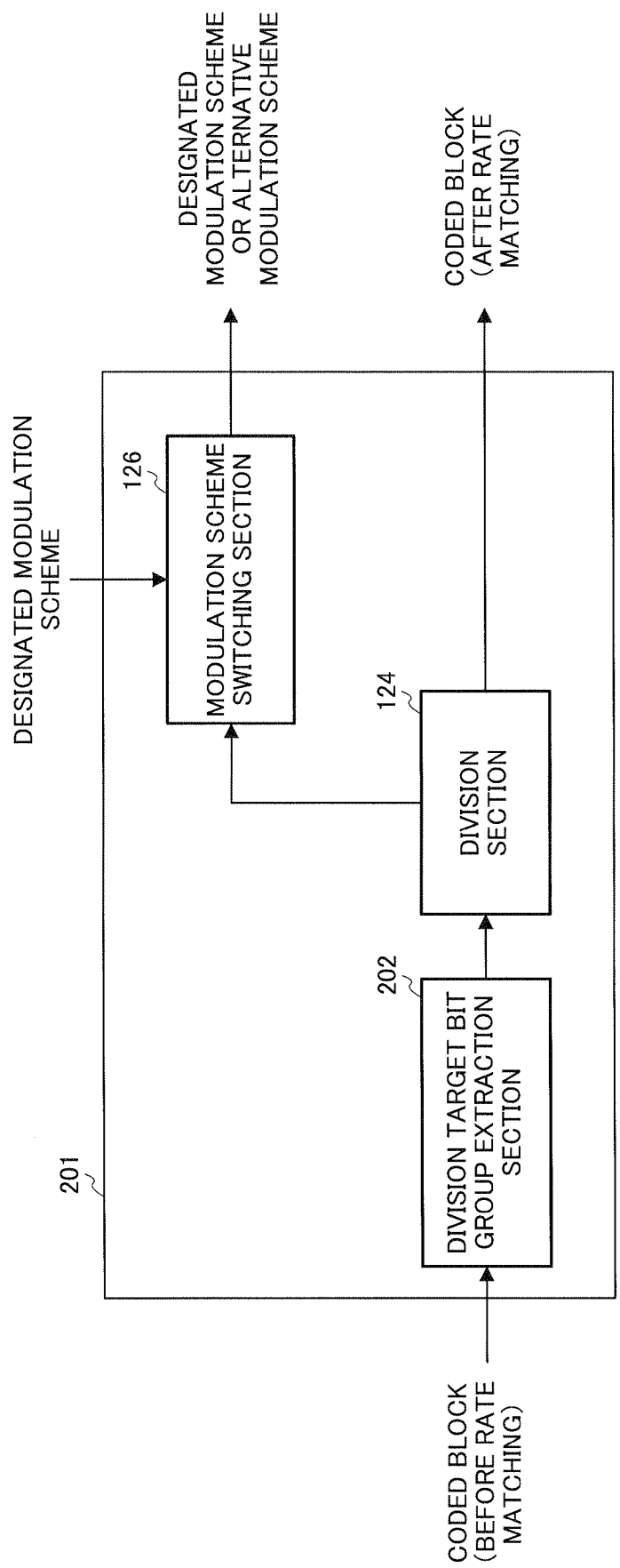
FIG. 11 is a block diagram showing the configuration of a rate matching section according to Embodiment 2 of the present invention.
Figure 12:
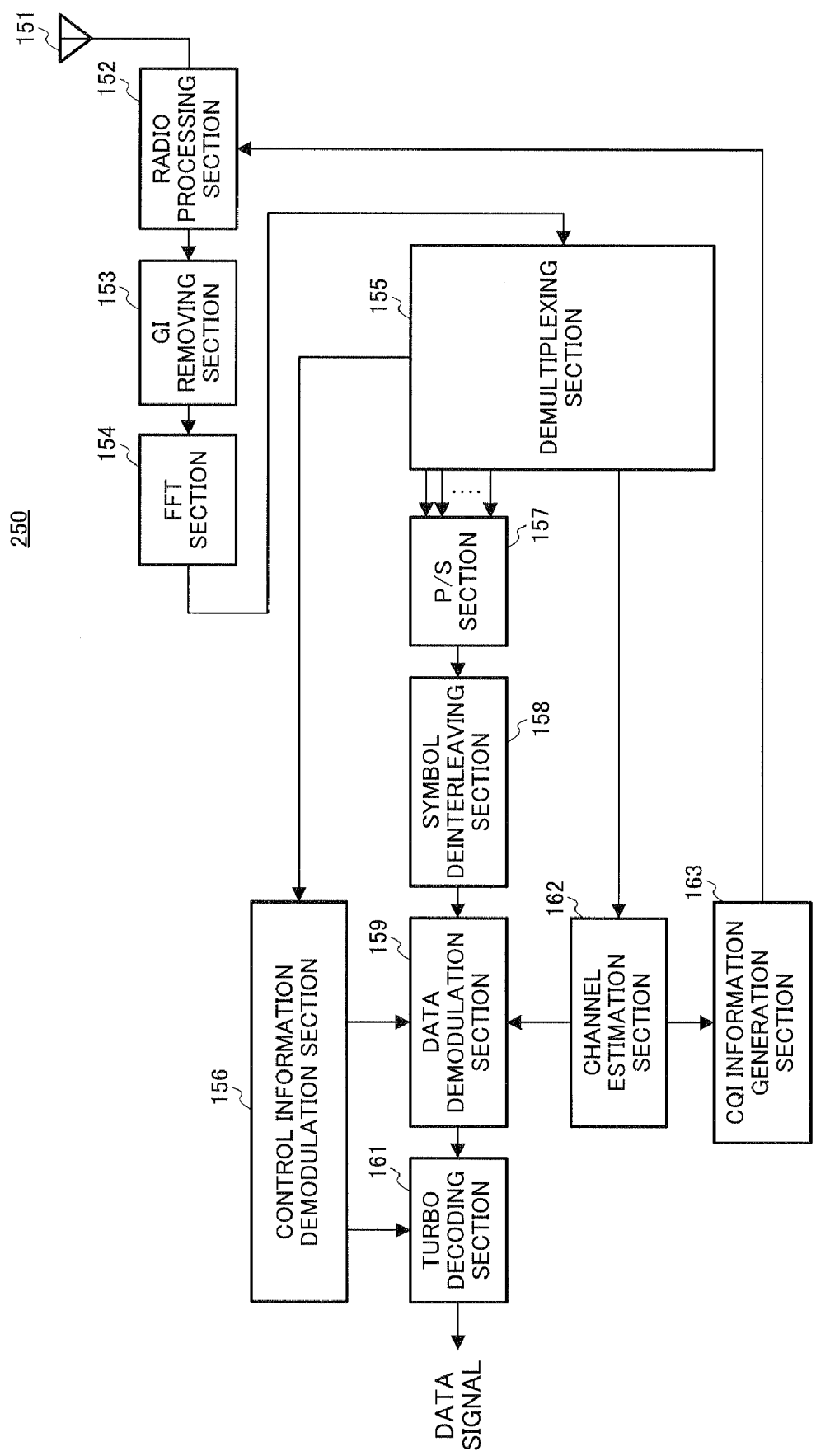
FIG. 12 is a block diagram showing the configuration of a mobile station apparatus according to Embodiment 2 of the present invention.

FIG. 10 is a block diagram showing the configuration of a base station apparatus according to Embodiment 2 of the present invention. FIG. 11 is a block diagram showing the configuration of a rate matching section according to the present embodiment. FIG. 12 is a block diagram showing the configuration of a mobile station apparatus according to the present embodiment. The base station apparatus, rate matching section, and mobile station apparatus described in the present embodiment have the same basic configurations as those of base station apparatus 100, rate matching section 106, and mobile station apparatus 150 described in Embodiment 1. Thus, the components that are identical to those described in Embodiment 1 use the same reference numerals, and detailed descriptions thereof are omitted.

Base station apparatus 200 of FIG. 10 has a configuration that provides rate matching section 201 in place of rate matching section 106 and removes bit interleaving section 104 in base station apparatus 100 with.

Rate matching section 201 of FIG. 11 has a configuration that provides division target bit group extraction section 202 in place of division target bit group extraction section 122 in rate matching section 106.

Division target bit extraction section 202 extracts, from the coded block (input coded block) obtained by turbo coding section 103, K bit groups as target bit groups corresponding to K symbols out of N symbols and outputs the result to division section 124. In the present embodiment, K bit groups constituted of systematic bits are extracted as target bit groups. N–K bit groups that are not extracted are outputted to division section 124 as non-target bit groups.

Although a case has been described with this embodiment as an example where the base station apparatus 200 has a configuration that includes modulation scheme switching section 126 inside rate matching section 201, the configuration of base station apparatus 200 is not limited only to the case described above. That is, modulation scheme switching section 126 may be provided outside rate matching section 106.

Although a case has been described with this embodiment as an example where base station apparatus 200 has a configuration that provides data modulation section 107 that is provided at a subsequent stage to rate matching section 201, the configuration of base station apparatus 200 is not limited only to the case described above. For example, data modulation section 107 may be provided inside rate matching section 201.

Mobile station apparatus 250 of FIG. 12 has a configuration that removes bit deinterleaving section 160 in mobile station apparatus 150.

Figure 13:
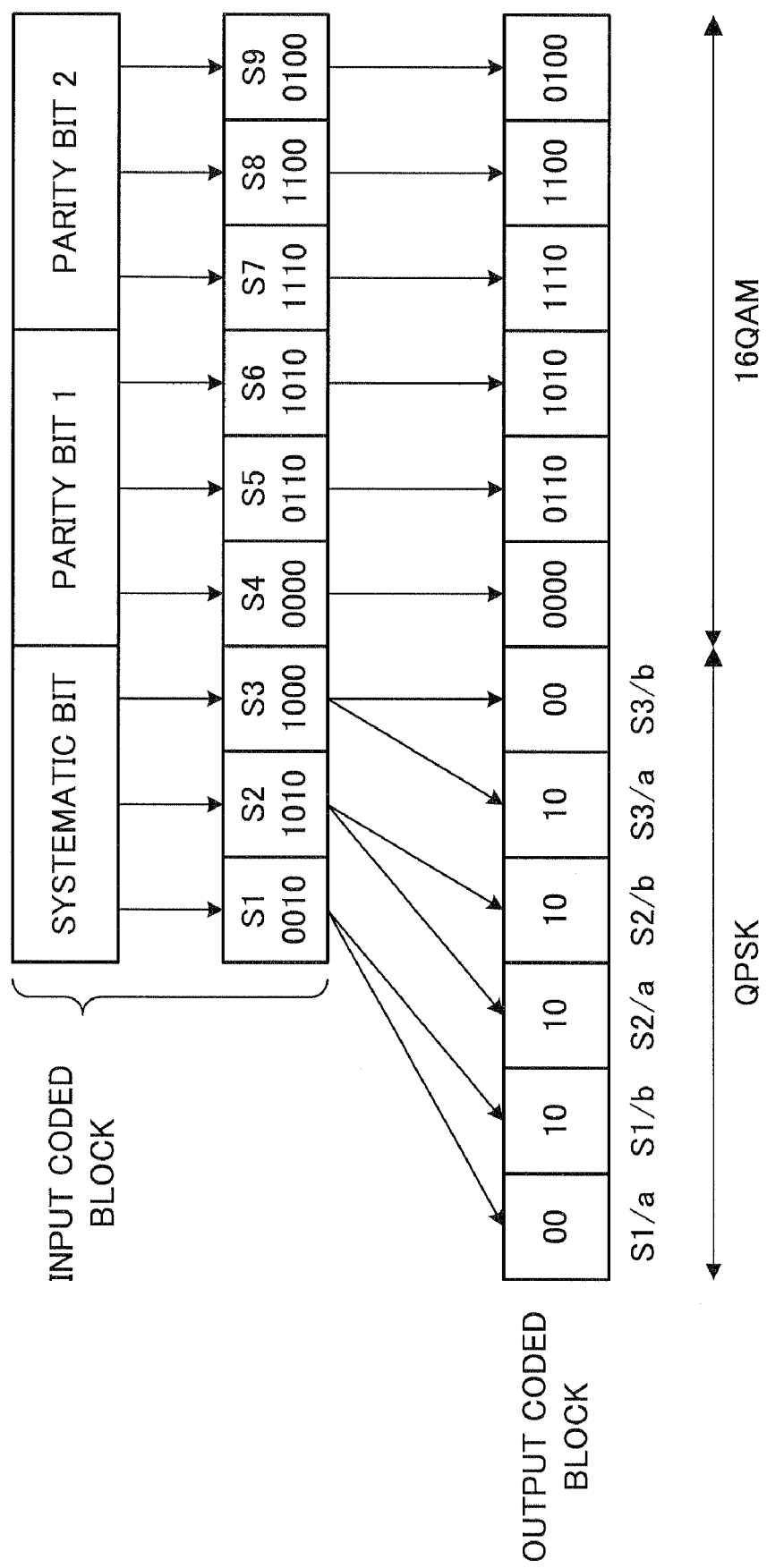
FIG. 13 is a drawing for explaining the rate matching processing and modulation processing of a base station apparatus according to Embodiment 2 of the present invention.

Next, the rate matching processing and modulation processing in base station apparatus 100 having the above configuration will be described with reference to FIG. 13. A case will be described as an example where an output coded block corresponding to 12 symbols is generated from an input coded block corresponding to 9 symbols. Further, the designated modulation scheme is set as 16 QAM and the alternative modulation scheme is set as QPSK. Furthermore, a case will be assumed where the coding rate is R=1/3.

First, division target bit group extraction section 202 extracts, from the input coded block, bit stream "0010" corresponding to symbol S1, bit stream "1010" corresponding to symbol S2, and bit stream "1000" corresponding to symbol S3, i.e., bit groups constituted of systematic bits.

Then, division section 124 divides the extracted bit stream "0010" into two bit streams "00" and "01" corresponding to the two symbols S1/a and S1/b. Similarly, division section 124 divides bit stream "1010" into two bit streams "10" and "10" corresponding to the two symbols S2/a and S2/b, and bit stream "1000" into two bit streams "10" and "00" corresponding to the two symbols S3/a and S3/b. Bit streams corresponding to symbols S4 to S9 that are not extracted by division target bit group extraction section 122 are not divided.

Then, modulation scheme switching section 126 sets modulation schemes of divided bit streams and non-divided bit streams. A modulation scheme of divided bit streams is set to QPSK since divided bit streams include two bits. A modulation scheme f or non-divided bit streams is set to 16 QAM since non-divided bit streams include four bits.

Then, data modulation section 107 modulates the 12 separated bit streams using the respective modulation schemes. In this manner, 12 symbols including 6 QPSK symbols and 6 16 QAM symbols are generated.

In this manner, according to the present embodiment, bit groups constituted of systematic bits are divided into a plurality of divided bit groups and M-ary number is reduced to a modulation scheme corresponding to divided bit groups so that error resistance of the systematic bits can be enhanced.

Although a case has been described with this embodiment as an example where the bits subject to error resistance enhancement are systematic bits, other types of bits may also be subject to error resistance enhancement, such as bits forming important data.

Embodiment 3

Figure 14:
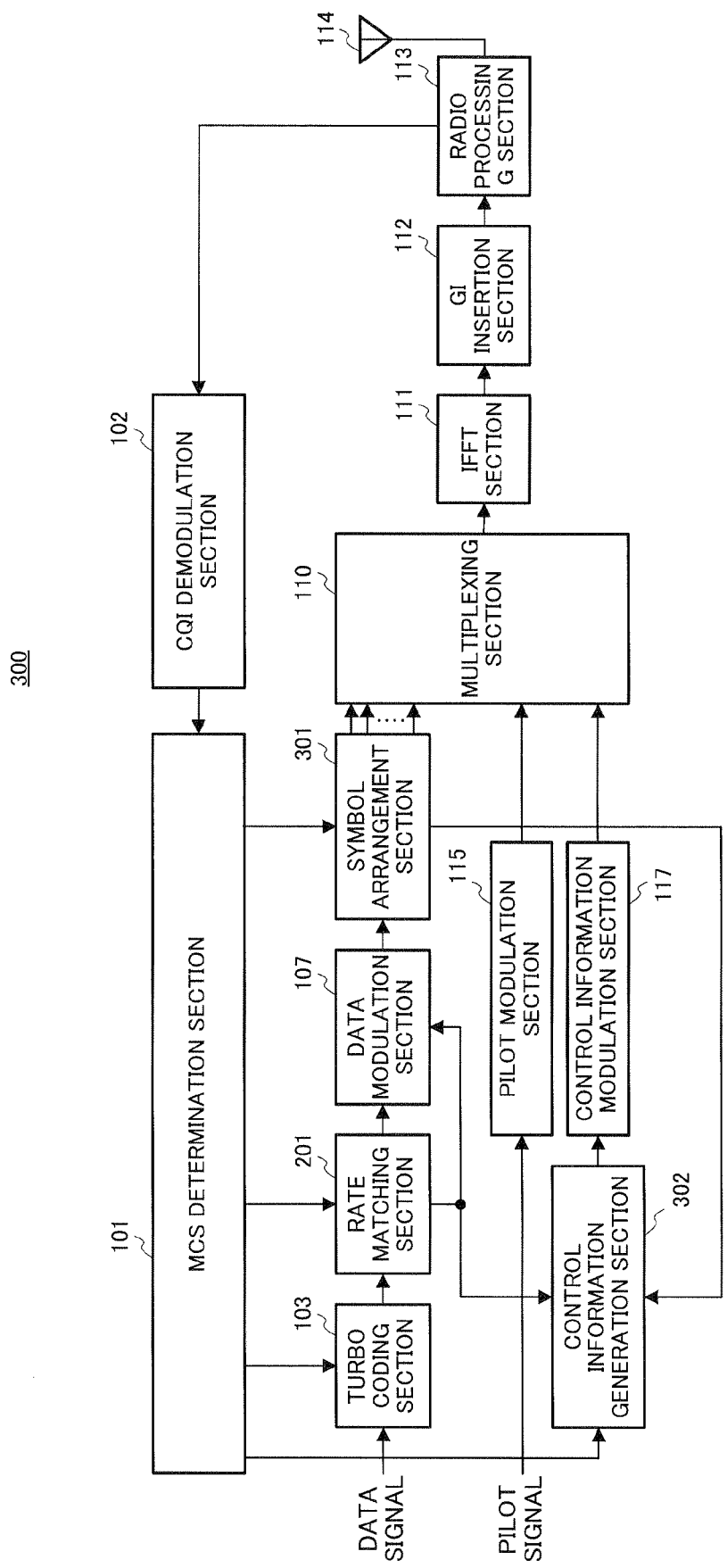
FIG. 14 is a block diagram showing the configuration of a base station apparatus according to Embodiment 3 of the present invention.
Figure 15:
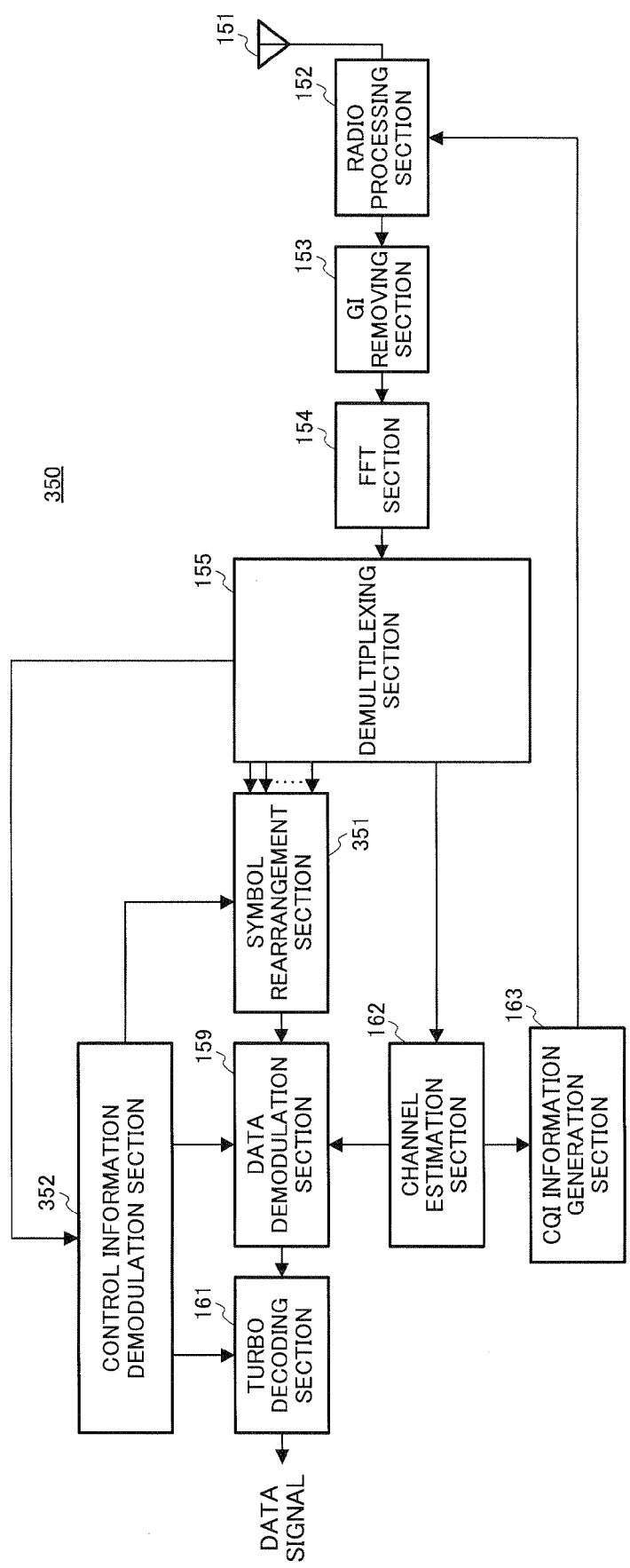
FIG. 15 is a block diagram showing the configuration of a mobile station apparatus according to Embodiment 3 of the present invention.

FIG. 14 is a block diagram showing the configuration of a base station apparatus according to Embodiment 3 of the present invention. FIG. 15 is a block diagram showing the configuration of a mobile station apparatus according to the present embodiment. The base station apparatus and mobile station apparatus explained in the present embodiment have the same basic configurations as those of base station apparatuses 100 and 200 and mobile station apparatuses 150 and 250 described in the above embodiments, respectively. Thus, the components that are identical to those described in either of the previous embodiments use the same reference numerals, and detailed descriptions thereof are omitted.

Base station apparatus 300 of FIG. 14 has a configuration that replaces the combination of the symbol interleaving section 108 and S/P section 109 provided in base station apparatus 200 of FIG. 10 with symbol arrangement section 301 and replaces control information generation section 116 provided in base station apparatus 200 with control information generation section 302.

Symbol arrangement section 301 arranges a plurality of symbols forming the modulated signal inputted from data modulation section 107 in the frequency domain. This symbol arrangement is performed in units of coded blocks at each transmission timing. The examples of symbol arrangement will later be described in detail. The modulation schemes after symbol arrangement are outputted to multiplexing section 110.

Further, symbol arrangement section 301 reports the positions ("symbol arrangement position") of the symbols constituted of a specific type of bits (in the present embodiment, symbols constituted of systematic bits) to control information generation section 302.

Control information generation section 302, similar to control information generation section 116 described in Embodiment 1, generates control information for reporting the coding rate of the coded block and modulation scheme of symbols to mobile station apparatus 350. Further, control information generation section 302 also generates control information for reporting the symbol arrangement position reported from symbol arrangement section 301.

Base station apparatus 350 of FIG. 15 has a configuration that replaces the combination of P/S section 157 and symbol deinterleaving section 158 provided in mobile station apparatus 250 of FIG. 12 with symbol rearrangement section 351, and replaces control information demodulation section 156 provided in mobile station apparatus 250 with control information demodulation section 352.

Control information demodulation section 352, similar to control information demodulation section 156 described in Embodiment 1, demodulates the control information inputted from demultiplexing section 155. As a result of this demodulation processing, the modulation schemes (the designated modulation scheme corresponding to non-divided bit groups and the alternative modulation scheme corresponding to divided bit groups) and the coding rate of bit groups forming the coded block are obtained. The coding rate is specified to turbo decoding section 161 and the modulation schemes are designated to data demodulation section 159. Furthermore, as a result of the demodulation processing, information related to the symbol arrangement position is obtained. The symbol arrangement position obtained is reported to symbol rearrangement section 351.

Symbol rearrangement section 351 rearranges a plurality of symbols forming the modulated signal inputted from demultiplexing section 155 in the frequency domain in accordance with the symbol arrangement position reported from control information demodulation section 352. To be more specific, symbol rearrangement section 351 returns the plurality of symbols forming the modulated signal back to the state prior to arrangement by symbol arrangement section 301. The modulated signal after symbol rearrangement is outputted to data demodulation section 159.

Figure 16:
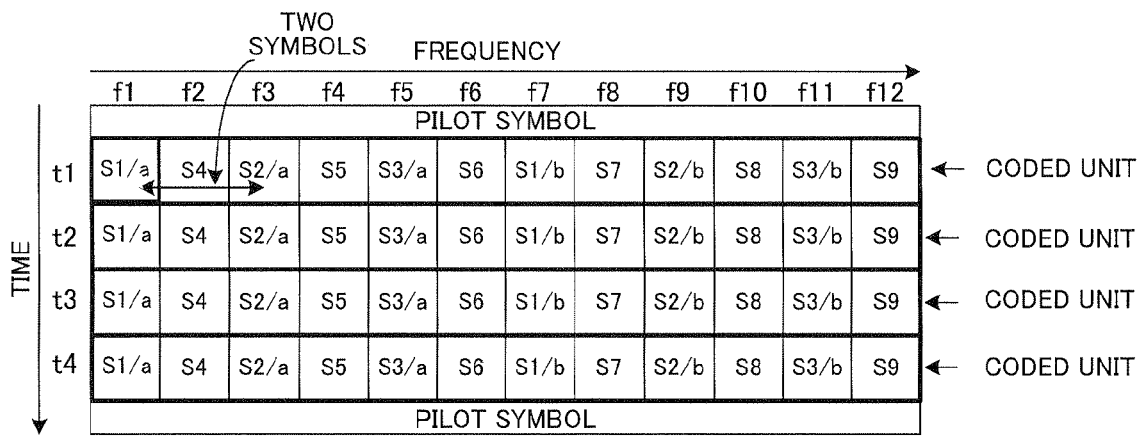
FIG. 16 is a drawing for explaining the first example of symbol arrangement according to Embodiment 3 of the present invention.
Figure 17:
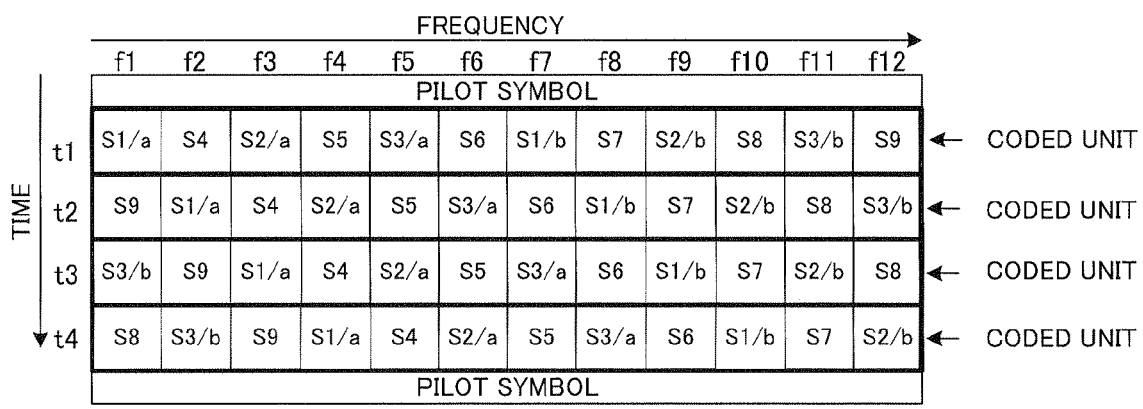
FIG. 17 is a drawing for explaining the second example of symbol arrangement according to Embodiment 3 of the present invention.
Figure 18:
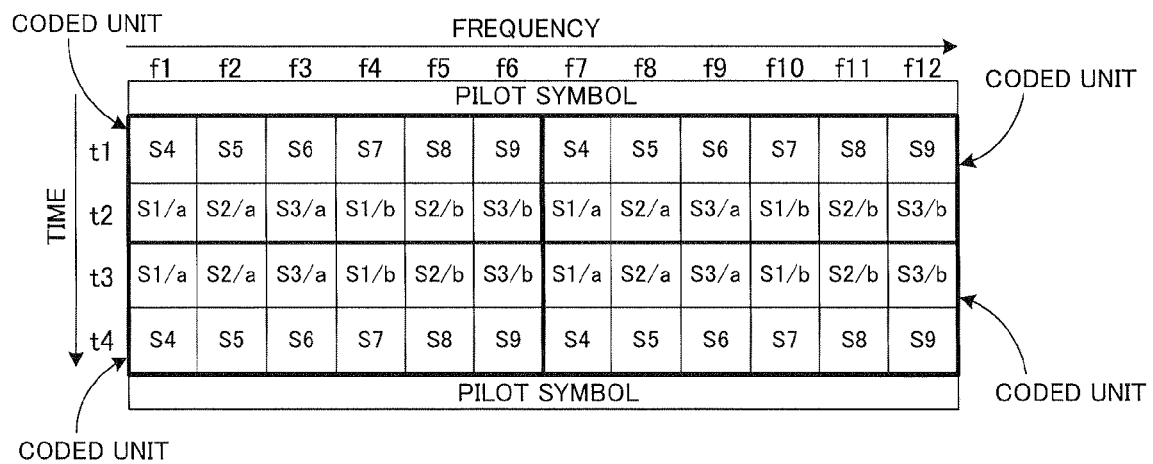
FIG. 18 is a drawing for explaining the third example of symbol arrangement according to Embodiment 3 of the present invention.

Symbol arrangement by symbol arrangement section 301 of base station apparatus 300 will be described using three examples of symbol arrangement. FIG. 16 is a diagram showing the first example of symbol arrangement, FIG. 17 is a diagram showing the second example of symbol arrangement, and FIG. 18 is a diagram showing the third example of symbol arrangement. In FIG. 16 to FIG. 18, S1/a and S1/b indicate the two divided symbols generated by dividing symbol S1 by L (by 2 in these illustrations), S2/a and S2/b indicate the two divided symbols generated by dividing S2 by L, S3/a and S3/b indicate the two divided symbols generated by dividing symbol S3 by L, and S4 to S9 indicate non-divided symbols that are not divided.

First, the first example of symbol arrangement will be described with reference to FIG. 16. At each transmission timing, divided symbols S1/a, S1/b, S2/a, S2/b, S3/a, and S3/b are arranged spaced apart from one another in the frequency domain. At this time, the symbol interval between a certain divided symbol and the divided symbol arranged closest to a certain divided symbol is determined in accordance with the operation M/(K×L). As in this example, where M=12, N=9 and L=2, the symbol interval is 2 symbols. By arranging the divided symbols in this manner, symbol arrangement that reduces the influence of frequency selective fading is realized at every coded block. That is, looking at one coded block, the number of systematic bits influenced by frequency selective fading is reduced and the bit error rate is improved.

Secondly, a second example of symbol arrangement will be described with reference to FIG. 17. In a second example of symbol arrangement, the symbols are arranged in the same manner as the first example of symbol arrangement. Furthermore, in the second example of symbol arrangement, to cope with the variation of channel state (channel quality) in the time domain is relatively moderate, the position of a symbol of the coded block of the previous transmission timing is shifted in the frequency domain. To be more specific, for example, divided symbol S1/a assigned to frequency f1 at transmission timing t1 is assigned to frequency f2 at transmission timing t2. In this manner, by changing positions of symbols in the frequency domain at each transmission timing, it is possible to prevent continuous decrease of the SNR of specific systematic bits and to improve the bit error rate.

Thirdly, a third example of symbol arrangement will be described with reference to FIG. 18. In the third example of symbol arrangement, divided symbols S1/a, S1/b, S2/a, S2/b, S3/a, S3/b, and the pilot symbols used for channel estimation are arranged spaced apart from one another in the time domain. At this time, non-divided symbols S4 to S9 are arranged adjacent to the pilot symbols in the time domain. When some of the non-divided symbols are not arranged adjacent to pilot symbols in the time domain, these non-divided symbols are arranged near the pilot symbols in the time domain. By arranging the divided symbols in this manner, it is possible to improve the channel estimation error resistance of the non-divided symbols, i.e. of the symbols modulated by a modulation scheme with a higher M-ary number than that of the divided symbols.

In this manner, according to the present embodiment, by arranging symbols in the specific positions in the frequency domain or in the time domain, the overall bit error rate of a specific type of bits can be improved.

Thus, the embodiments according to the present invention have been described.

The rate matching apparatus, radio transmitting apparatus, and radio receiving apparatus according to the present invention are not limited to the above Embodiments 1 to 3 and may be implemented with various changes. For example, the embodiments can be appropriately combined and implemented.

Furthermore, although cases have been described with above embodiments as examples where the present invention is formed with hardware, the present invention can be implemented by software.

Function blocks described in the above embodiments may typically be implemented as an LSI constituted by integrated circuits. These may be individual chips, or partially or totally contained on a single chip.

Here, LSI is adopted here, but this may also be referred as IC, system LSI, super LSI, and ultra LSI depending on the differences in the extents of integration.

The method of circuit integration is not limited to LSI's, and implementation using dedicated circuitry or general-purpose processors may also be possible. After LSI manufacturing, an FPGA (Field Programmable Gate Array) or a reconfigurable processor where connections and settings of circuit cells within an LSI can be reconfigured may also be possible.

Furthermore, if integrated circuit technology comes out to replace LSI's as a result of the advancement of semiconductor technology or a derivative other technology, it is naturally possible to carry out function block integration using this technology. Application in biotechnology is also possible.

The present application is based on Japanese Patent Application No. 2004-339500, filed on Nov. 24, 2004, the entire content of which is expressly incorporated by reference herein.

INDUSTRIAL APPLICABILITY

The rate matching apparatus, radio transmitting apparatus, radio receiving apparatus, and rate matching method of the present invention can be applied to apparatuses such as a base station apparatus or mobile station apparatus used in a radio communication system.

The invention claimed is:

1. A radio transmission apparatus, comprising:
a rate matching section that extracts, from a first coded block corresponding to N symbols, a first bit group corresponding to one or more of the N symbols, divides the extracted first bit group into L divided bit groups that correspond to L symbols, and substitutes the L divided bit groups for the extracted first bit group within the first coded block, to generate a second coded block corresponding to N+K symbols, N and K being integers that are greater than or equal to 1, and L being an integer that is greater than or equal to 2 and less than or equal to K+1; and
a modulation section that modulates bit groups of the second coded block other than one or more of the L divided bit groups using a first modulation scheme, and modulates the one or more of the L divided bit groups using a second modulation scheme, to generate the N+K symbols, the second modulation scheme having an M-ary number lower than an M-ary number of the first modulation scheme.

2. The radio transmission apparatus according to claim 1, further comprising a generation section that generates information for reporting a number of symbols N and a number of symbols N+K to a radio reception apparatus, the reporting information being generated when the first modulation scheme and the second modulation scheme are known by the radio reception apparatus.

3. The radio transmission apparatus according to claim 1, wherein, when the M-ary number of the first modulation scheme is eight or more, the rate matching section divides the first bit group.

4. The radio transmission apparatus according to claim 1, wherein:
the rate matching section obtains a first divided bit group and a second divided bit group both having a same number of bits; and
the modulation setting section modulates the obtained first divided bit group and the obtained second divided bit group using the second modulation scheme.

5. The radio transmission apparatus according to claim 1, wherein:
the rate matching section divides the first bit group to obtain a second divided bit group comprising one bit; and
the modulation section modulates the obtained second divided bit group using a binary phase shift keying (BPSK) modulation scheme.

6. The radio transmission apparatus according to claim 1, wherein:
the rate matching section divides the first bit group to obtain a second divided bit group comprising two bits; and the modulation section modulates the obtained second divided bit group using a quadrature phase shift keying (QPSK) modulation scheme.

7. The radio transmission apparatus according to claim 1, wherein the first bit group extracted from the first coded block is a bit group comprising a specific type of bit.

8. The radio transmission apparatus according to claim 7, wherein the first bit group extracted from the first coded block is a bit group comprising a systematic bit.

9. The radio transmission apparatus according to claim 1, further comprising an arrangement section that arranges the L symbols spaced apart in a frequency domain, wherein:
the modulation section modulates the L divided bit groups, using modulation schemes set respectively for the L divided bit groups, to obtain the L symbols out of the N+K symbols.

10. The radio transmission apparatus according to claim 9, wherein the arrangement section determines an interval between the L symbols in the frequency domain in accordance with (N+K)/(K×L).

11. The radio transmission apparatus according to claim 9, wherein the arrangement section changes positions of the L symbols in the frequency domain at each transmission timing.

12. The radio transmission apparatus according to claim 1, further comprising an arrangement section that arranges the L symbols spaced apart from a pilot symbol in a time domain, wherein:
the modulation section modulates the L divided bit groups, using modulation schemes set respectively for the L divided bit groups, to obtain the L symbols out of the N+K symbols.

13. A radio reception apparatus comprising:
a reception section that receives N+K symbols generated from a second coded block, the second coded block being obtained by dividing a bit group corresponding to one or more of N symbols of a first coded block into L divided bit groups corresponding to L symbols and substituting the L divided bit groups for the bit group within the first coded block, N and K being integers that are greater than or equal to 1, and L being an integer that is greater than or equal to 2 and less than or equal to K+1; and
a demodulation section that demodulates a symbol other than one or more of the L symbols out of the N+K symbols using a first modulation scheme demodulates the one or more of the L symbols using a second modulation scheme, the second modulation scheme having an M-ary number lower than an M-ary number of the first modulation scheme.

14. A modulation method performed at a radio transmission apparatus, the modulation method comprising:
extracting, from a first coded block corresponding to N symbols, a first bit group corresponding to one or more of the N symbols, N being an integer that is greater than or equal to 1; and
dividing the extracted first bit group into L divided bit groups that correspond to L symbols, and substituting the L divided bit groups for the extracted first bit group within the first coded block, to generate a second coded block corresponding to N+K symbols, L being an integer that is greater than or equal to 2 and less than or equal to K+1, and K being an integer that is greater than or equal to 1; and
modulating bit groups of the second coded block other than one or more of the L divided bit groups using a first modulation scheme, and modulating the one or more of the L divided bit groups using a second modulation scheme, to generate the N+K symbols, the second modulation scheme having an M-ary number lower than an M-ary number of the first modulation scheme.

15. A demodulation method performed at a radio reception apparatus, the demodulation method comprising:

receiving N+K symbols generated from a second coded block, the second coded block being obtained by dividing a bit group corresponding to one or more of N symbols of a first coded block into L divided bit groups corresponding to L symbols, and substituting the L divided bit groups for the bit group within the first coded block, N and K being integers that are greater than or equal to 1, and L being an integer that is greater than or equal to 2 and less than or equal to K+1; and demodulating a symbol other than one or more of the L symbols out of the N+K symbols using a first modulation scheme, and demodulating the one or more of the L symbols using a second modulation scheme, the second modulation scheme having an M-ary number lower than an M-ary number of the first modulation scheme.

* * * * *

UNITED STATES PATENT AND TRADEMARK OFFICE
CERTIFICATE OF CORRECTION

| | | |
|---|---|---|
| PATENT NO. | : 8,085,866 B2 | Page 1 of 1 |
| APPLICATION NO. | : 11/719905 | |
| DATED | : December 27, 2011 | |
| INVENTOR(S) | : Isamu Yoshii et al. | |

It is certified that error appears in the above-identified patent and that said Letters Patent is hereby corrected as shown below:

Claim 4, column 13, line 52, incorrectly reads:

"the modulation setting section modulates the obtained first"

and should read:

"the modulation section modulates the obtained first"

Claim 13, column 14, line 45, incorrectly reads:

"symbols using a first modulation scheme demodulates"

and should read:

"symbols using a first modulation scheme, and demodulates"

Signed and Sealed this
Nineteenth Day of June, 2012

David J. Kappos
*Director of the United States Patent and Trademark Office*